Sept. 30, 1969   E. L. KOCHEY, JR   3,469,446
VOLUMETRIC FLUID FLOWMETER
Filed Sept. 30, 1965   4 Sheets-Sheet 1

FIG. 1

INVENTOR
EDWARD L. KOCHEY, JR
BY E L Kochey
AGENT

INVENTOR
EDWARD L. KOCHEY, JR.

Sept. 30, 1969  E. L. KOCHEY, JR  3,469,446
VOLUMETRIC FLUID FLOWMETER
Filed Sept. 30, 1965  4 Sheets-Sheet 4

INVENTOR
EDWARD L. KOCHEY, JR.
BY *E L Kochey*
AGENT

United States Patent Office 3,469,446
Patented Sept. 30, 1969

3,469,446
VOLUMETRIC FLUID FLOWMETER
Edward L. Kochey, Jr., Colebrook, Conn., assignor to Combustion Engineering, Inc., Windsor, Conn., a corporation of Delaware
Continuation-in-part of application Ser. No. 140,850, Sept. 26, 1961. This application Sept. 30, 1965, Ser. No. 491,567
Int. Cl. G01f 1/00
U.S. Cl. 73—196                                18 Claims

ABSTRACT OF THE DISCLOSURE

An instrument for measuring volumetric flow of the fluid independent of its density. A pressure difference is sensed between two locations in the conduit with the locations being selected such that pressure drop due to fluid flow and the pressure drop due to static head are equal in magnitude but opposite in direction at a first preselected velocity. The second pressure differential is obtained between two locations in the conduit with these locations being selected such that the pressure drop due to fluid flow and the pressure drop due to static head are equal in magnitude but opposite in direction at a different second preselected velocity. These sensed pressure differentials are related to the first and second predetermined velocities in order to determine the actual volumetric flow rate.

---

This is a continuation-in-part of my copending application Ser. No. 140,850, filed Sept. 26, 1961, now U.S. Patent No. 3,225,340, issued Dec. 21, 1965. This invention relates to flow metering and in particular to a method and apparatus for determining the volumetric flow, such as velocity of a fluid in a conduit, regardless of the density of the fluid.

Volume flow has been determined in the past by volumetric displacement meters and also pressure differential meters such as those using an orifice. When such a pressure differential meter is used, the pressure drop across the orifice is determined and the density of the fluid is independently determined. This density is generally obtained by measuring the temperature and pressure of the fluid and determining the corresponding density. The pressure difference reading across the orifice is then compensated in accordance with the density so determined, and the velocity is thereby determined. This has long been used and is generally quite satisfactory when used in an environment where the density may be readily determined.

Not only does the instant invention preclude the need for independent determination of density but it is particularly advantageous when used in an environment where the density cannot be readily determined from measurements such as temperature and pressure. Such an environment would include water in the supercritical range at a temperature of around 720° F. and pressure about 3500 p.s.i. where density changes very rapidly with minor changes in temperature and pressure, and two-phase generally homogeneous mixtures such as coal slurry or pulverized coal and air flow.

In using an orifice type flowmeter it is recognized that there is a hydrostatic head difference between the two pressure taps employed when these pressure taps are at different elevations. Conventional flow meters used in this manner are compensated for in accordance with this difference. My invention, however, utilizes this static head difference as one of its significant elements rather than subtracting it from the pressure difference.

A flowmeter based on this principle is disclosed in my copending application U.S. Ser. No. 140,850, filed Sept. 26, 1961. The principles embodied in this flowmeter will be reviewed in the discussion of FIG. 1. Suffice it to say here, however, that this flowmeter is such that it determines a preselected velocity and also indicates whether the flow is above or below the preselected velocity. It is not, however, capable of determining any and all velocities without a separate pressure tap for each velocity desired.

The instant invention is capable of reading or controlling any velocity with a single installation.

It is an object of my invention to determine the velocity, or volume of a fluid flowing, within a conduit in a manner which is independent of the density of the fluid.

Other and further objects of the invention will become apparent to those skilled in the art as the description proceeds.

With the aforementioned objects in view, the invention comprises an arrangement, construction and combination of the elements of the inventive organization in such a manner as to attain the results desired, as hereinafter more particularly set forth in the following detailed description of an illustrative embodiment, said embodiment being shown by the accompanying drawings wherein:

Figure 1:
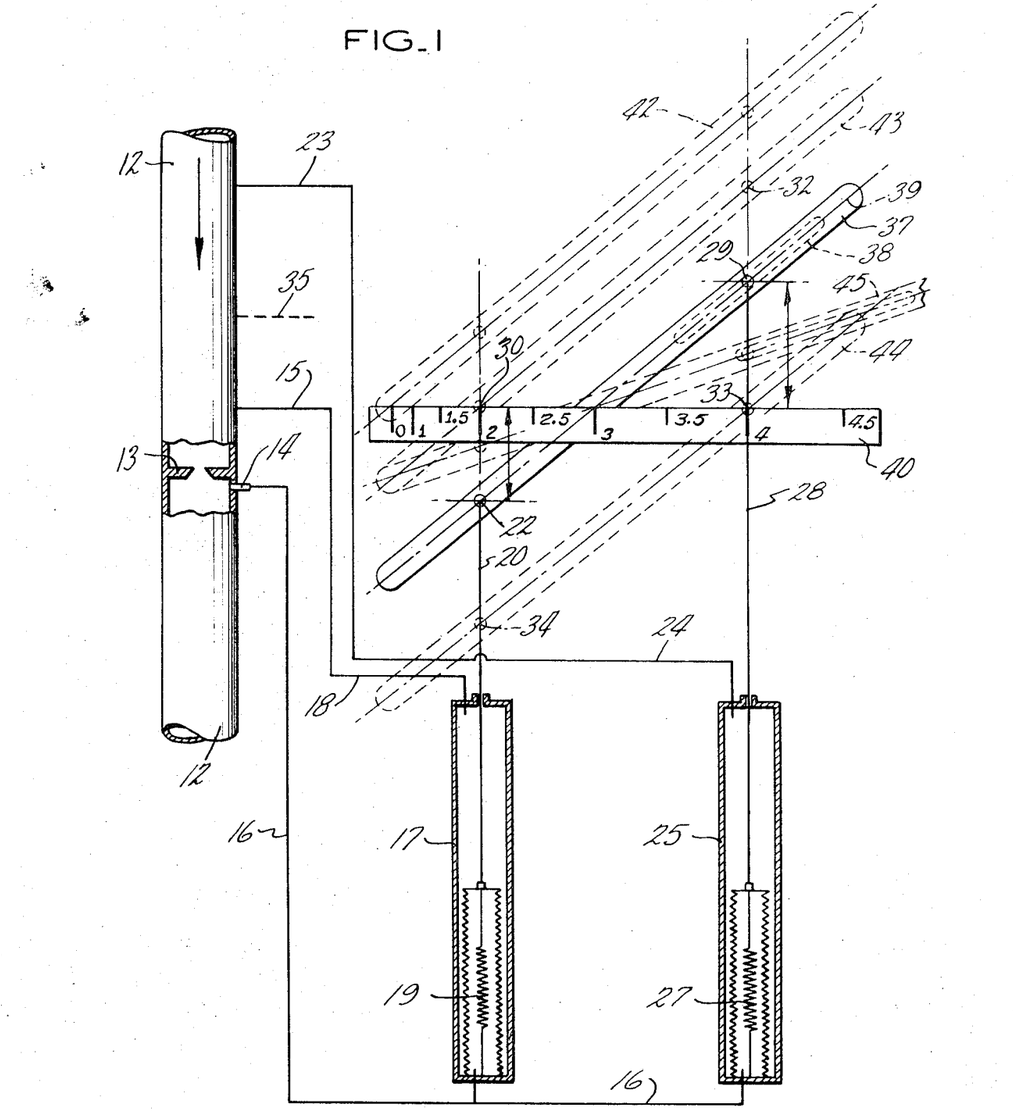
FIG. 1 illustrates the flowmeter utilized in a downflow pipe and employing mechanical linkages for determining the velocity, with the mechanical linkage approach being selected to better illustrate the principles involved.

Referring to FIG. 1 there is illustrated a vertical pipe 12 through which is conveyed a fluid of unknown and varying density. Orifice 13 is placed in the line with this orifice having a known size and configuration. Pressure tap 14 is located on the downstream side of the orifice.

A first flowmeter is set up across the orifice in such a manner as to read a zero differential at 2 feet per second as indicated in my copending application Ser. No. 140,850, now U.S. Patent No. 3,225,340, issued Dec. 21, 1965. This is accomplished in the following manner. With the known configuration of orifice 13, it can be determined that at the preselected differential of 2 feet per second the pressure drop through the orifice is a fixed figure when measured in feet of the fluid flowing. In this case the configuration of the orifice is that at a velocity of 2 feet per second the pressure drop through the orifice is 4 feet of the fluid flowing. Upstream pressure tap 15 is then located at an elevation at this preselected figure (i.e., 4 feet) above the downstream nozzle 14.

At this point in the explation we may assume that the pressure drop through the length of pipe is negligible. The pressure at tape 15 is 4 feet of the fluid flowing less than the pressure at tap 14 due to the hydrostatic head of the fluid, but the pressure is 4 feet of the fluid flowing higher than the pressure at tap 14 due to the restriction of the orifice 13 whenever the velocity is 2 feet per second. Accordingly, the actual pressure difference between pressure taps 14 and 15 is zero when the velocity is 2 feet per second.

At higher velocities the pressure at tap 15 will be higher than that at 14 while for lower velocities the pressure at tap 15 will be lower than that at tap 14. The amount of deviation of this pressure difference from zero is dependent on both the velocity and the density of the fluid flowing. Therefore although these two pressure taps can be used to determine a velocity of 2 feet per second regardless of density, the readings will not give a velocity reading at other densities. The significant feature of this combination of two pressure taps with the orifice is that at a known preselected velocity the actual pressure difference existing between the nozzles is zero while this pressure difference deviates therefrom at other velocities.

Pressure transmitting line 16 conveys the pressure from tap 14 to one side of a pressure difference meter 17 while presure transmitting line 18 conveys the pressure signal from tap 15 to the other side of the differential pressure meter 17. This flowmeter 17 is compensated for the cold water leg correction by means of spring 19. Although the pressure difference between the taps 14 and 15 is zero, in actually conveying the sensed pressure to the instrument the cold water leg difference is imposed on the meter. This water leg correction is based on the elevation difference between the two pressure taps and the density of the cold water in the pressure transmitting line. This cold water is not at the temperature of the fluid flowing but is rather at ambient temperature and, therefore, is a fixed and known quantity. When this water leg correction is made by spring 19, the meter operates through link 20 so that the vertical location of pin 22 is proportional to the actual pressure difference existing between pressure taps 14 and 15.

When a velocity of 4 feet per second is flowing in the pipe, the pressure drop through orifice 13 is equal to 16 feet. In order to establish the second flowmeter in such a manner that it reads zero differential pressure for 4 feet per second, an upstream pressure tap 23 is located at an elevation 16 feet above the pressure tap 14. The pressures sensed at taps 14 and 23 are transmitted through pressure transmitting lines 16 and 24 to opposite sides of the second flowmeter 25. The second flowmeter is similarly corrected by spring 27 for the water leg correction, this correction being the weight of a static head of cold water between the elevations of pressure taps 14 and 23. The second pressure difference meter operates through link 28 locating pin 29 such that its vertical location is proportional to the actual pressure difference between taps 14 and 23.

When the velocity is 2 feet per second, the differential pressure between taps 14 and 15 are zero and the meter will locate pin 22 at location 30. At this time pressure tap 23 will sense a pressure lower than the pressure at tap 14 and pressure difference meter 25 will locate pin 29 at location 32.

If the velocity is 4 feet per second, the pressure difference between taps 14 and 23 will be zero with pin 29 being located at point 33 while pressure at tap 15 will be higher than at tap 14 so that pin 22 is located at location 34.

If the velocity in the pipe were 3 feet per second, the pressure drop through the orifice 13 would be 9 feet of the fluid flowing. If a hypothetical pressure tap 35 were located 9 feet above pressure tap 14, the pressure difference between taps 14 and 35 would be zero. Conversely if the elevation in pipe 12 could be determined such that the pressure difference between that elevation and pressure tap 14 were zero, the velocity could be determined. Since we would know the location of the hypothetical tap and the number of feet at this tap which is located above the downstream tap, we would know the pressure drop which corresponds to the orifice pressure drop as measured in feet of the fluid flowing.

My object, therefore, with the following mechanism is to determine the location of the hypothetical tap 35 or any other such tap for any velocity based on readings obtained by the pressure difference meters 17 and 25. The pressure sensed at pressure tap 23 is lower than the pressure at the hypothetical tap 35 by the hydrostatic head difference between the two points. Similarly, the pressure sensed at tap 15 is higher than that at the hypothetical tap 35 by the hydrostatic head difference between these two locations. Since the pressure at each of the taps 15 and 23 differs from the zero pressure difference figure which would occur at the hypothetical tap 35 by the static head difference of the fluid, interpolation between the two pressure readings will determine the location of the hypothetical tap 35. This will be true regardless of the density of the fluid flowing since the static head difference between the hypothetical tap and each of the two taps 15 and 23 will vary in the same proportion as density changes. This principle will operate to determine by interpolation any velocity between 4 and 2 feet per second while extrapolation will similarly determine velocities above 4 feet per second and below 2 feet per second, even to the negative flow range. Such interpolation and extrapolation is accomplished by the use of indicating bar 37 which is shown in the position for 3 feet per second velocity flow. This bar is pinned to link 20 at pin 22 and is connected by means of a slot 38 to link 28 at pin 29. Indicating line 39 extends along the center of this bar.

Velocity indicating scale 40 is located so that it intersects the indicating bar 37 at the zero pressure drop location for each of the pressure difference meters. The linear distances along the velocity scale 40 are proportional to the elevation differences between the pressure taps. Since pressure drop generally varies as the square of the flow, the velocity scale, whether considered with respect to hypothetical pressure taps or along the velocity scale, is a square relationship. Such a scale is shown on the velocity scale 40. The actual velocity in the pipe is read where the indicating line 39 intersects velocity scale 40 which in this case indicates a velocity of 3 feet per second. For the same density bar 37 would be at location 42 when the velocity is zero foot per second, location 43 when the velocity is 2 feet per second and location 44 when the velocity is 4 feet per second. The indicating bar 37 would be in similar locations for higher and lower velocities intersecting the velocity scale where higher or negative velocities may be read.

The bar is shown in location 45 which would exist for a velocity of 3 feet per second in the pipe with a density less than that considered for the previous showing of the bar location. Since the density is not as great the actual pressure difference between the hypothetical tap 35 and taps 15 and 23 will be less but will be in the same proportion. Accordingly, the deviation of each pressure difference meter from zero is less but in the same proportion and indicating bar 37 now in location 45 will again intersect the velocity scale 40 for the 3 feet per second location.

Although the figure embodiment has been discussed in terms of velocity, obviously this is directly equivalent to volume flow. Since the flow area of the pipe is known, the velocity at any time is directly proportional to the volume flow. Furthermore, the indications on the velocity scale 40 could be shown in terms of velocity at some other upstream or downstream location which passes the same flow as the measuring location but has a different flow area. The pressure tap locations can also be varied with Venturis, pipe elbows or other devices employed in which pressure drop is a function of the flow quantity and density. While both pressure difference meters are illustrated as sharing the common pressure tap 14, they could equally well use completely independent taps. The significant elements of the pressure sensing locations is that the first pressure differential be obtained in such a manner that the pressure difference is zero at a first preselected velocity while it deviates therefrom at any other velocity while a second pressure difference is determined which is zero at a second and different predetermined velocity while it deviates therefrom at other velocities. Either one of these velocities could, of course, be zero. The actual velocity is then determined by relating these deviations from zero pressure difference with the preselected velocities.

The water leg correction which was handled in pressure difference meters 17 and 25 by the springs 19 and 27 could be eliminated by the use of transducers for sensing of the pressure at the various locations thereby avoiding cold water leg problems. In any event, the pressure difference which is utilized is the actual pressure difference occurring between the pressure taps. The proportional relationship of these parameters may be handled according to the following mathematical relationships where:

$l$ = the height or any pressure tap above the downstream pressure tap 14.
$L_a$ = the elevation difference between tap 14 and a first pressure tap.
$L_b$ = the elevation difference between tap 14 and a second pressure tap. If desired, L may also be used as a linear measure along the velocity scale 40 as measured from the point corresponding to zero velocity.
$A$ = the actual pressure difference between tap 14 and the first selected location.
$B$ = the pressure difference between tap 14 and the second selected location.
$V$ = the actual velocity.
$V_a$ = the velocity corresponding to a zero pressure difference between tap 14 and the first selected tap.
$V_b$ = the velocity corresponding to the zero pressure difference between tap 14 and the second preselected location.

The location of the hypothetical pressure tap for the actual zero delta P for any flow condition is as follows:

$$L = \frac{B(L_a - L_b)}{A - B}$$

For an actual established flowmeter setup $L_a$ and $L_b$ will be known constants. Where $L_a$ is 4 and $L_b$ is 16, this function then reduces as follows:

$$L = 16 + \frac{12B}{A - B}$$

Since there is a direct relation between velocity and the hypothetical pressure tap location, the relation may be set up in terms of velocity as follows:

Where pressure drop varies with the nth power of velocity (1) $$V = \sqrt[n]{V_b{}^n - \frac{B}{A - B}(V_a{}^n - V_b{}^n)}$$

Since pressure drop is generaly considered as varying with the square of velocity, this expression is better shown as (2) $$V = \sqrt{V_b{}^2 - \frac{B}{A - B}(V_a{}^2 - V_b{}^2)}$$

Where the first velocity or $V_a$ equal 2 feet per second and $V_b$ equals 4 feet per second, this expression reduces to (3) $$V = \sqrt{16 + \frac{12B}{A - B}}$$

If the pressure taps are set up so that the first velocity $V_a$ is zero, the relationship may be expressed as (4) $$V = V_b \sqrt{1 + \frac{B}{A - B}}$$

or $$V = V_b \sqrt{\frac{A}{A - B}}$$

The foregoing discussion has assumed that there was a negligible frictional pressure drop between pressure taps 15 and 23. However since the frictional pressure drop is directly proportional to the length of a pipe, the frictional pressure drop between taps 15 and 35 and the pressure drop between the taps 35 and 23 are proportional to each other in the same proportion as the static heads. Therefore even if the pressure drop in this length of pipe were substantial, it can readily be seen that the same results would accrue. The question of nonuniform pressure drop with respect to height will be considered in the discussion of FIG. 5. This frictional pressure drop between taps 15 and 23 must be considered when determining the location of tap 23 such that the pressure difference between taps 23 and 14 is zero at the 4 feet per second velocity.

Figure 2:
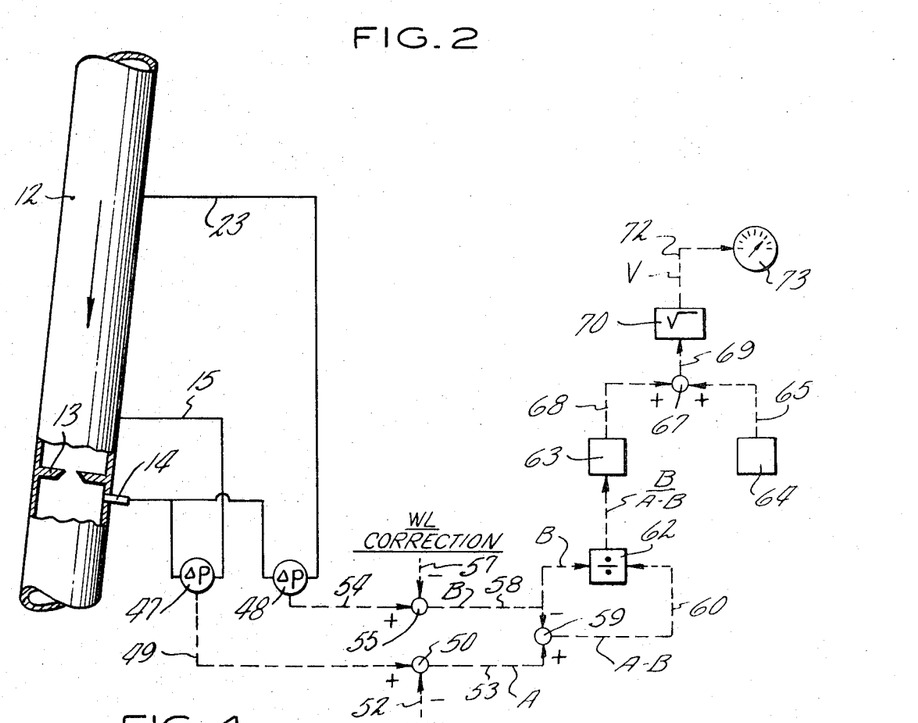
FIG. 2 illustrates a flowmeter employed in the same environment utilizing electrical instrumentation.

FIG. 2 illustrates a similar application of the flow measuring meter where it is also applied to vertical pipe 12 containing orifice 13 and having fluid flowing downwardly therein. Pressure taps 14, 15 and 23 are similarly located with pressure difference transmitter 47 being connected to pressure taps 14 and 15 between which a zero pressure difference exists at 2 feet per second, while pressure difference transmitter 48 is connected to pressure taps 14 and 23 between which zero pressure difference exists at a velocity of 4 feet per second. A control signal representative of the pressure difference sensed by transmitter 47 is passed through control line 49 to summation point 50. Here control signal 52, which is representative of the constant cold water leg correction, is subtracted so that the signal passing through control line 53 is representative of the actual pressure difference between pressure taps 14 and 15. This control signal is designated as A.

Similarly, pressure difference transmitter 48 passes a control signal representative of the sensed pressure difference through control line 54 to summation point 55 where water leg correction signal 57 is subtracted. The signal passing through control line 58 is then representative of the actual pressure difference between taps 14 and 23 and is designated as B.

The actual velocity may then be determined in accordance with Equation 2 using conventional analogue computation circuits of the type described in Electrical Analogue Computers by Korn and Korn, published by McGraw-Hill Book Co., Inc., or Control Engineer's Handbook by John G. Truxel, also published by McGraw-Hill Book Co., Inc. At summation point 59 control signal B is subtracted from control signal A with this difference signal passing through control line 60. Control signal B is divided by control signal representing $(A - B)$ by the division circuit 62, with the resultant signal passing to multiplier 63 where the signal is multiplied by the factor 12. Voltage source 64 establishes a voltage which passes through line 65 and is representative of the quantity 16 in the equation, with this voltage being added at summation point 67 to the voltage passing through line 68. This summation voltage is passed through control line 69 to the square root circuit 70 so that the control signal passing through the control line 72 is representative of the actual velocity flowing in the pipe. This control signal passes to velocity indicating meter 73 which reads the actual velocity.

Figures 3, 7, 8, 9:
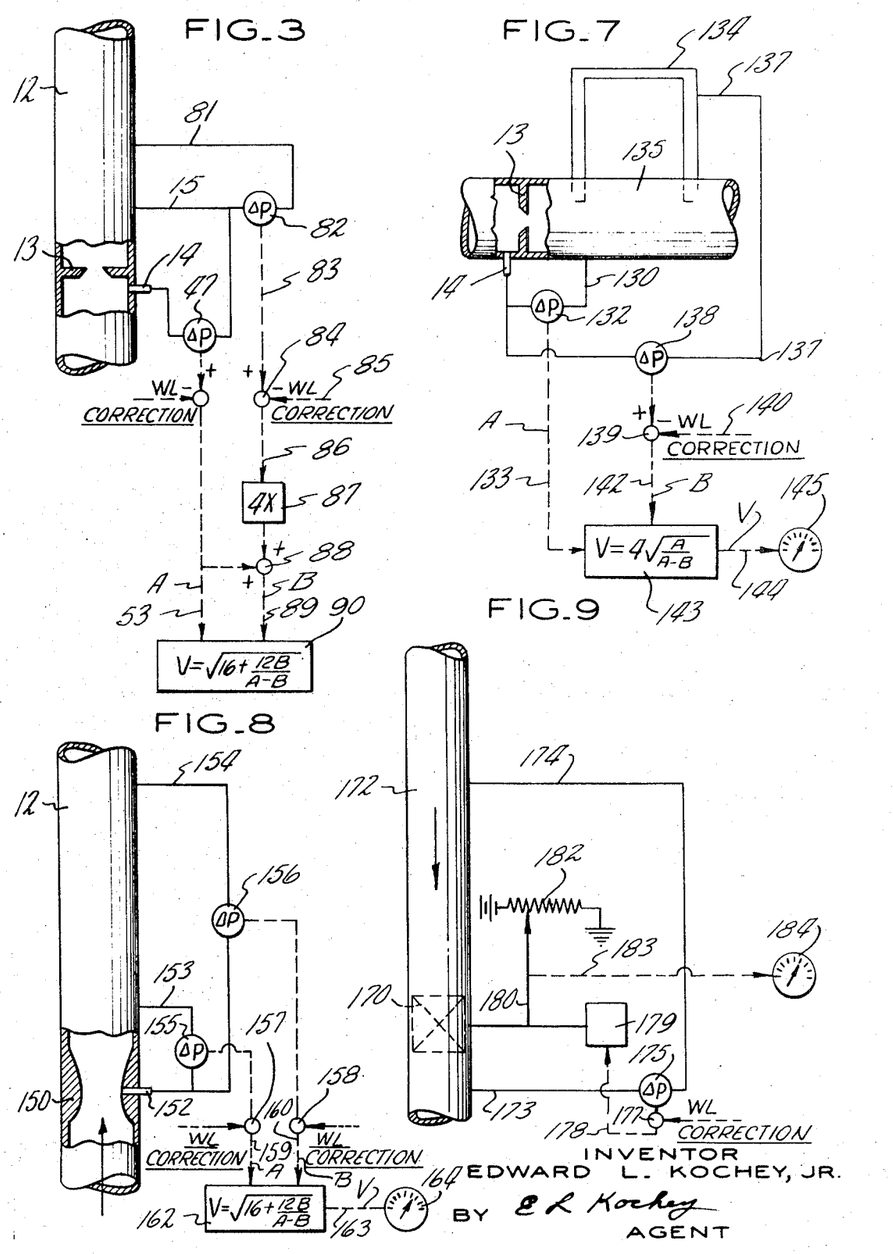
FIG. 3 illustrates a flowmeter utilized in a downflow pipe with a different meter arrangement wherein less elevation head is required.
FIG. 7 illustrates a velocity flowmeter utilized in conjunction with a horizontal conduit.
FIG. 8 is illustrative of the application of the velocity flowmeter through an upflow pipe.
FIG. 9 illustrates a velocity flowmeter in the downflow pipe illustrating a single pair of pressure taps and a calculable variable orifice.

FIG. 3 illustrates the application of a flowmeter to a pipe similar to that of FIGS. 1 and 2. This figure, however, illustrates a method of obtaining the same results with a smaller vertical distance required between the upstream and downstream pressure taps. Pressure taps 14 and 15 are located as previously described for a velocity of 2 feet per second. It is noted that in the earlier figures pressure tap 23, which was used as the pressure point for a velocity of 4 feet per second, was located 16 feet above pressure tap 14, and, therefore, 12 feet above pressure tap 15. It is here again desired that this pressure tap be used to establish 4 feet per second. However, instead of being located 12 feet above tap 14, the pressure tap 81 in this figure is established at a location 3 feet above pressure tap 15.

The pressure difference between taps 15 and 55 is sensed by pressure transmitter 82 with a control signal representing the sensed pressure difference transmitted through control signal line 83 to summation point 84. Water leg correction signal 85 is subtracted here with a control signal representative of the actual pressure difference between pressure taps 15 and 81 passing through control line 86. This signal passes through multiplier 87 which multiplies the signal by four thereby giving a pressure difference signal which is representative of that which would exist between pressure tap 15 and a pressure tap 12 feet above that. It is noted that this corresponds to the upstream pressure tap 23 of FIGS. 1 and 2.

At summation point 88 control signal representing the pressure difference between taps 14 and 15 is added to the control signal which leaves multiplier 87 so that the control signal passing through control line 89 is the B signal described with reference to FIG. 2. Similarly, an A signal passes through control line 53 which is established as described in the discussion of FIG. 2. The control signals from control lines 53 and 89 pass to the analogue computer circuit 90 which is representative of the remainder of the circuit as illustrated in more detail in FIG. 2.

Pressure tap 81 may be used in conjunction with pressure taps 14 and 15 as previously described with respect to FIGS. 1 and 2 without the use of the multiplier. In such a case, however, the zero reading betweent pressure taps 14 and 81 would occur at a velocity much lower than 4 feet per second. Velocity indications at higher flow rates could, of course, be extropolated in such an environment. However, the FIG. 3 embodiment showing the multiplication of the signal may have advantages depending on the particular control equipment available and its accuracy.

Figure 4:
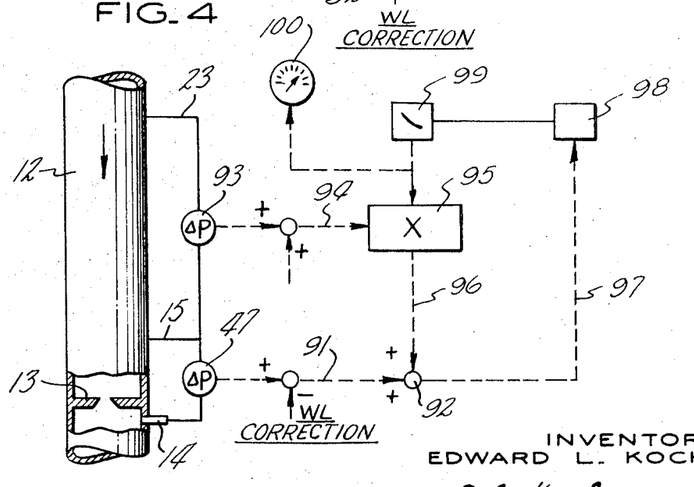
FIG. 4 illustrates a flowmeter in a similar environment using the approach of seeking the zero pressure difference point by variably multiplying one of the signals.

FIG. 4 illustrates another application of the same principle to the downflow pipe 12 containing an orifice 13. This embodiment operates with the step of multiplying the pressure drop signal as did the previous embodiment, however, the multiplication factor is variable and is varied until the hypothetical tap location at which the pressure difference is zero is located. To effect this, pressure taps 14, 15 and 23 are located as previously described. Pressure difference meter 47 senses the pressure difference between pressure taps 14 and 15 and emits a signal representative of this pressure difference. This signal is corrected for the water leg error so that a control signal representative of the actual pressure difference between taps 14 and 15 passes through control line 91 to summation point 92.

Pressure difference meter 93 senses the pressure difference between pressure taps 15 and 23 with a control signal being corrected for water leg error passed through control line 94 to multiplying controller 95. The incoming pressure difference signal is multiplied by a factor, with the increased pressure difference signal passing through control line 96 to the summation point 92.

The signals passing through control lines 91 and 96 are added at summation point 92 and if the sum of these signals is zero, no error signal passes through control line 97. However should this sum deviate from zero, a control signal is passed through control line 97 to controller 98 which operates the function generator 99. This function generator establishes the factor by which the control signal passing through control line 94 is multiplied in the multiplying controller 95. This control loop operates so that the factor employed is varied until the error signal passing thorugh control line 77 is zero indicating a balanced control loop. A signal at the same time passes from the function generator 92 to the velocity indicating meter 100. This signal is, of course, representative of the factor by which a control signal passing through line 94 is multiplied to achieve a zero signal in control line 97. Effectively this means that the elevation difference between taps 15 and 23 is multiplied by this factor to obtain a hypothetical location of tap 23 such that the pressure difference between the hypothetical tap and pressure tap 14 is zero. Since the relationship between this location or multiplication factor and velocity in the pipe 12 can be readily determined, the velocity indicating meter 100 is so calibrated and reads directly in velocity.

Figure 5:
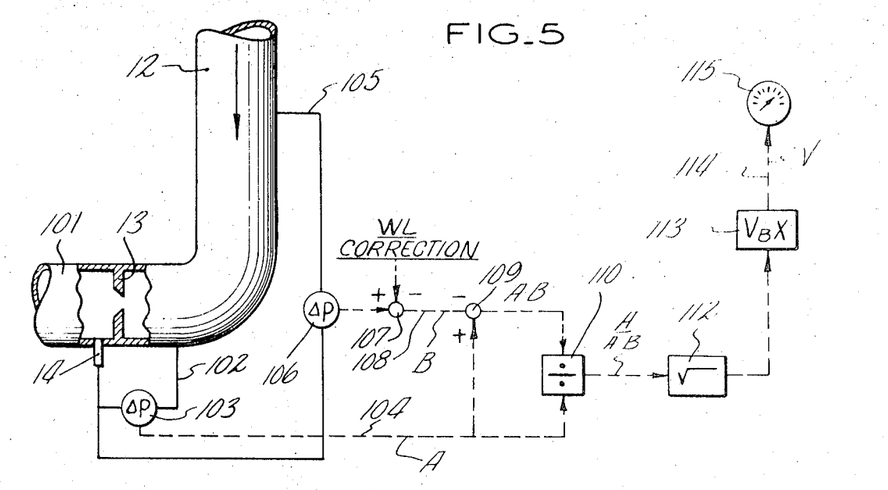
FIG. 5 illustrates the flowmeter used in such a manner that one of the pressure difference meters has no static head difference imposed thereon.

FIG. 5 shows the flow meter set up in such a manner that one of the pressure difference meters reads zero at zero velocity, deviating therefrom at other velocities. Vertical pipe 12 conveys fluid downwardly therethrough and has an elbow with a horizontal portion 101 at the lower end. Orifice 13 is installed in the horizontal portion of pipe. Pressure tap 14 is located downstream of the orifice with pressure tap 102 being located upstream of the orifice but on the same elevation as pressure tap 14. Pressure difference transmitter 103 senses the pressure difference and transmits a signal through control line 104. This signal is the A signal previously described, there being no water leg correction required since there is no differential elevation of the two cold legs 14 and 102.

Pressure tap 105 is located at an elevation 16 feet above the elevation of pressure tap 14 since 16 feet of the fluid flowing is the pressure drop through the orifice 13 when the velocity in the pipe is 4 feet per second. Pressure difference transmitter 106 senses the pressure difference between taps 14 and 105 with a control signal being emitted that is corrected for water leg differential at summation point 107 with control signal passing through control line 108 which is representative of the B signal previously discussed.

The analogue computation circuit utilizes these control signals A and B in accordance with Equation 4 where $V_b$ equals 4 feet per second. The B signal is subtracted from the A signal at summation point 109 with this resultant signal being divided by the A signal in the division circuit 110. This resultant signal passes through the square root extraction circuit 112 and the multiplication circuit 113 where the signal is multiplied by 4 feet per second such that the signal in control line 114 is representative of the actual velocity existing within the pipe. This signal passes to velocity indicating meter 116 which reads velocity directly.

In the discussion of FIG. 1 the effect of pressure drop between pressure taps similar to 102 and 105 of FIG. 4 is discussed. As contrasted to the earlier embodiment, however, we have here an elbow intermediate the two pressure taps and, therefore, the frictional pressure drop between two pressure tap locations certainly is not linear. Accordingly, the installation of an actual pressure tap at the hypothetical tap location would be in error due to the nonuniform frictional drop. However with the interpolation method dealing with the hypothetical tap location, the frictional drop in the pipe may be treated as though it were uniform and, accordingly, the resultant reading on velocity indicator 115 will be accurate even though the frictional drop between the taps 102 and 105 is not uniform.

Figure 6:
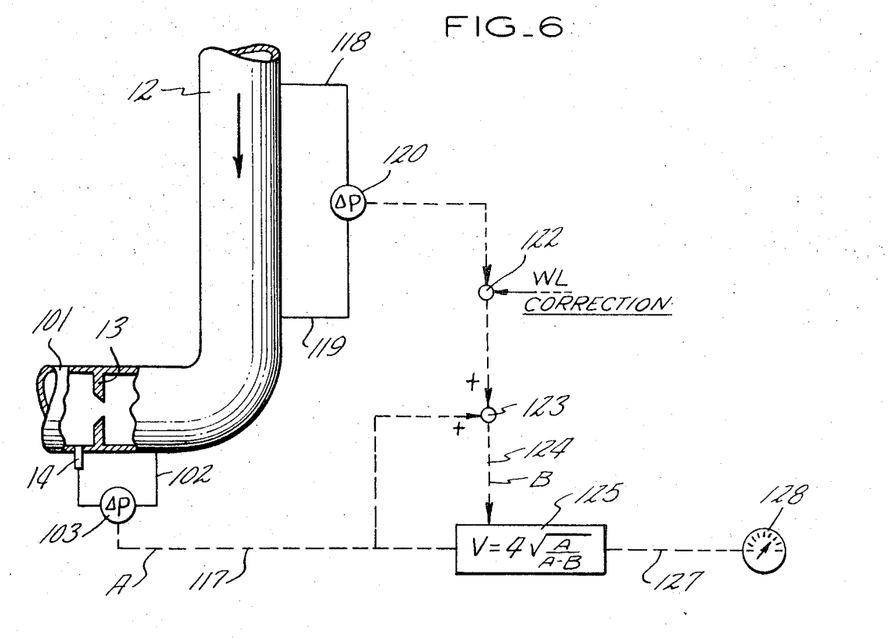
FIG. 6 illustrates a similar application using separate taps for each pressure difference meter.

In FIG. 6 a fluid flowmeter is differently connected to the same system as illustrated in the last embodiment. Differential pressure meter 103 again senses the pressure difference across orifice 13 by means of pressure taps 14 and 102. The control signal which is the A reading is passed through control line 117. Pressure taps 118 and 119 are located in the vertical portion of pipe 12 with the vertical distance between these taps being a preselected value. This value is such that when the velocity is 4 feet per second, the pressure drop between taps 114 and 102 plus any pressure drop between taps 118 and 119 as measured in the feet of fluid flowing equals the vertical distance. Pressure difference transmitter 120 senses the pressure difference between taps 118 and 119 with the control signal resulting therefrom being corrected at summation point 122 for water leg differential. At summation point 123 a control signal representing the pressure drop between taps 114 and 102 is added so that the control signal passing through control line 124 is the B signal representing the pressure difference between taps 14 and 102 plus the pressure difference between taps 118 and 119. The A and B signals then pass through the analogue computer circuit 125 with a control signal representing the actual velocity passing through control line 127 to velocity indicating meter 128.

In this embodiment the pressure difference existing in the pipe between pressure taps 102 and 119 is not measured nor is it in any manner determined. This, however, does not disturb the efficacy of the system since it is immaterial whether such pressure drop is located in an unmeasured portion of the pipe intermediate taps 102 and 119 or at a location outside of taps 118 and 14. Further the pressure difference between taps 118 and 119 could be used as the B signal, without adding the difference between taps 14 and 102, so long as the proper corresponding preselected velocity is used (i.e., that at which the pressure difference between taps 118 and 119 is zero). An additional orifice could also be added between taps 118 and 119.

FIG. 7 illustrates an application of the meter to a horizontal run of pipe. Again pressure tap 14 is located downstream of orifice 13 with the pressure tap 130 being located upstream of the orifice. Pressure difference transmitter 132 senses the pressure difference across the orifice with a signal passing out through control line 133 being representative of the A value since there is no water leg correction required.

Shunt line 134 is located on the pipe 135 so that it receives flow from the pipe at one location and discharges it into the pipe at a second location. The fluid flowing through this shunt line 134 is, therefore, at the same temperature and density as the fluid flowing through the pipe 135. Therefore pressure tap 137 is located in the shunt line at a distance 16 feet above the elevation of pressure tap 14. This 16 feet figure is selected in this case because this is the friction pressure drop between taps 14 and 137 occurring at a velocity of 4 feet per second. It should be noted that since there is flow in the shunt line 134, there may be a corresponding pressure drop in the shunt line. The flow through this line is proportional to the flow in the pipe and pressure drops existing in the shunt line would also be proportional to the flow in the pipe. Therefore the appropriate pressure drop can be considered in selecting the proper elevation difference for the preselected velocity.

Pressure differential transmitter 138 senses the pressure difference between pressure taps 14 and 137 and sends a control signal to the summation point 139. Here the signal is corrected for the cold water leg by water leg correction signal 140 with a control signal passing through control line 142 which is representative of the B value. Signals A and B are conveyed to the analogue computer circuit 143 with the control signal passing through line 144 which is representative of the velocity flowing in the pipe. This signal is conveyed to indicating flowmeter 145 from which velocity may be directly read.

FIG. 8 shows one method of applying the flowmeter to an upflow pipe. It should be noted that the previously discussed arrangements are generally useful for upflow without changing the apparatus, since the equipment is capable of reading in the negative range. In this embodiment of FIG. 8, however, pipe 12 contains a Venturi nozzle 150 with pressure tap 152 being located at the throat. Due to the increase in velocity at this location the static pressure is reduced from that existing just before the Venturi and after the Venturi by an amount dependent on the velocity and density. The static pressure is recovered after leaving the Venturi while it decreases as the fluid flows up the pipe due to the static head differential. Pressure tap 153 is located at an elevation in the pipe such that the differential pressure between pressure taps 152 and 153 is zero at 2 feet per second. Pressure tap 154 is located at a higher elevation such that the differential pressure between pressure taps 152 and 154 is zero at 4 feet per second. Pressure differential meters 155 and 156 determine the differential pressure between respective pressure taps with control signals being conveyed to summation points 157 and 158 where correction is made for the cold water leg. A control signal then passes through control line 159 which is representative of the A value while a second control signal passing through control line 160 is representative of the B value. These signals to analogue computer circuit 162 which calculates the velocity in accordance with the equation shown therein so that a control signal passes through control line 163 which is representative of the velocity flowing in the pipe. A signal passes to velocity indicating meter 164 from which the velocity of flow can be read.

FIG. 9 illustrates a system arranged to control the fluid flow to any selected velocity utilizing the principles of my invention but with a variable restriction. Velocity indicating valve 170 is located in the vertical downflow pipe 172 and this valve has a known flow vs. pressure drop characteristic. The maximum flow which it is desired to maintain is 4 feet per second and, accordingly, the pressure drop through this valve with the valve wide open in the velocity of 4 feet per second is determined. Downstream pressure tap 173 and upstream pressure tap 174 are connected to the pipe 172 with the vertical distance between these taps being such that the pressure drop between these taps due to the rate of flow and measured in feet of the fluid flowing is equal to the vertical distance. Therefore with the valve wide open and a velocity of 4 feet per second, a zero pressure difference will exist between the pressure taps 173 and 174. Pressure transmitter 175 senses the pressure difference with a signal being sent to summation point 177 where correction is made for the cold water leg weight. Therefore the control signal passing through control line 178 is representative of the actual pressure difference between pressure taps 173 and 174.

Valve controller 179 operates valve 170 with indicating arm 180 cooperating with fixed resistance system 182 such that a control signal is passed through control line 183 which represents the position of valve 170. Whenever the control signal passing through control line 178 deviates from zero, controller 179 moves the valve in a direction such as to return the differential to zero. Since the characteristic of the valve 170 is known, this motion of the controller 179 and which is sensed by indicator 180 can be calibrated. With the valve wide open zero pressure differential exists when the velocity in the pipe is 4 feet per second. With the valve 50 percent closed, pressure drop equal to the vertical distance between pressure taps 173 and 174 will occur at a lower velocity. The particular velocity can be readily calculated by known pressure drop calculation methods or the valve may be calibrated in the laboratory. This may be determined for a plurality of valve positions, and it is therefore known that whenever the pressure difference between taps 173 and 174 is zero, a particular valve position represents a particular velocity in the pipe. It is a control signal which represents this position which is passed through control line 183 to the velocity control indicating meter 184.

While I have illustrated and described a preferred embodiment of my invention it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What I claim is:

1. An apparatus for measuring the volumetric flow rate of a fluid flowing within a conduit, independent of its density comprising: first sensing means sensing the pressure difference between a first and a second location in the conduit; second sensing means sensing the pressure difference between a third and a fourth location in the conduit, at least one of said third and fourth locations being other than said first and second locations and at least one of said locations being at a different elevation than the other locations; the pressure difference due to flow and the pressure difference due to the hydrostatic head of the fluid between the first and second locations being equal in magnitude but opposite in direction for a first predetermined flow rate, and deviating therefrom at other flow rates; the pressure difference due to flow and the pressure difference due to the hydrostatic head of the fluid between the third and fourth locations being equal in magnitude but opposite in direction at a different second predetermined flow rate, and deviating therefrom at other flow rates, at least one of said predetermined flow rates being approximately at the flow rate expected to be measured; means for determining the deviation from zero of said first sensing means; means for determining the deviation from zero of said second sensing means, the deviation of each sensing means being proportional to the difference between the actual flow rate and the corresponding predetermined flow rate, and to the density of the fluid flowing; means for relating said deviations with said first and second predetermined flow rates to determine the actual flow rate.

2. An apparatus as in claim 1 wherein said means for relating said deviations with said first and second predetermined flow rates operates, where V equals the flow rate to be determined, $V_a$ equals the first predetermined flow rate, $V_b$ equals the second predetermined flow rate, A equals the deviation of said first sensing means from zero, and B equals the deviation of said second sensing means from zero, according to the relationship $$V = \sqrt{V_b^2 - \frac{B}{A-B}(V_a^2 - V_b^2)}$$

3. An apparatus as in claim 1 having also a shunt tube, said shunt tube located so as to withdraw fluid flowing within the conduit from the main portion of the conduit, convey the withdrawn fluid through an elevation difference and return it to the main portion of the conduit, said shunt tube forming a portion of the conduit; said fourth location being located in the shunt tube portion of the conduit.

4. An apparatus as in claim 1 wherein the first predetermined flow rate is zero and the first and second locations are at a common elevation.

5. An apparatus as in claim 4 wherein said means for relating said deviations with said first and second predetermined flow rates operates, where V equals the flow rate to be determined, $V_b$ equals the second predetermined flow rate, A equals the deviation of said first sensing means from zero and B equals the deviation of said second sensing means from zero, according to the relationship $$V = V_b \sqrt{\frac{A}{A-B}}$$

6. An apparatus as in claim 4 wherein said first and third locations are such that the same pressure is sensed at each location at all times.

7. In a fluid conveying conduit an apparatus for measuring the volume flow independent of the density of the fluid comprising: a restriction in said conduit; a first sensing means responsive to the actual pressure difference between two locations in the conduit on opposite sides of said restriction, said locations selected so that the pressure drop between the two locations is zero at a first preselected velocity, and deviates therefrom at any other velocity; a second sensing means responsive to the actual pressure difference between two locations in the conduit on opposite sides of said restriction, said locations selected so that the pressure difference between these two locations is zero at a second different preselected velocity, and derivates therefrom at any other velocity, at least one of said predetermined velocities being approximately at the velocity expected to be measured; and means for comparing the proportional response of said first and said second sensing means and said first and second preselected velocities to determine the volume of fluid flow.

8. An apparatus for measuring the volumetric flow rate of a fluid flowing within a conduit independent of its density comprising: a first sensing means responsive to the actual pressure difference between a first and a second location in the conduit, the differential elevation between the first and second locations being such that the pressure difference due to flow and the pressure difference due to static head between the two locations are equal in magnitude but opposite in direction at a first preselected velocity; a second sensing means responsive to the actual pressure difference between a third and a fourth location in the conduit, the differential elevation between the third and fourth locations being such that the pressure difference due to flow and the pressure difference due to static head pressure difference between the two locations is equal in magnitude but opposite in direction at a different second predetermined velocity, at least one of said predetermined velocities being approximately at the velocity expected to be measured; and means for comparing the proportional response of said first and second sensing means together with said first and second preselected velocities to determine the volume rate of fluid flow.

9. An apparatus for measuring the volumetric flow rate of a fluid flowing within a conduit independent of its density comprising: a first sensing means responsive to the actual pressure difference between a first and a second location in the conduit, the differential elevation between the first and second locations being such that the frictional pressure difference and the pressure difference due to static head between the two locations are equal in magnitude but opposite in direction at a first preselected velocity; a second sensing means responsive to the actual pressure difference between a third and a fourth location in the conduit, the differential elevation between the third and fourth locations being such that the frictional pressure difference and the pressure difference due to static head pressure difference between the two locations is equal in magnitude but opposite in direction at a second predetermined velocity, at least one of said predetermined velocities being approximately at the velocity expected to be measured; and means for comparing the proportional response of said first and second sensing means together with said first and second predetermined velocities to determine the volume rate of fluid flow.

10. An apparatus for measuring the volumetric flow rate of a fluid flowing within a conduit, independent of its density comprising: a first sensing means sensing the pressure difference between a first and a second location in the conduit; a fixed resistance in the conduit between the two locations of such magnitude that the pressure difference between the first and second locations due to flow at a first preselected velocity equals the static head of the fluid; a second sensing means sensing the pressure difference between a third and fourth location in a conduit, at least one of said third and fourth locations being different than said first and second locations; fixed resistance in the conduit between the third and fourth locations, being of such magnitude that the pressure difference due to flow equals the static head of the fluid between the third and fourth locations at a second preselected velocity, at least one of said predetermined velocities being approximately at the velocity expected to be measured; means for determining the deviations from zero of said first and second sensing means, the deviation of each being proportional to the difference between the actual flow rate and the corresponding predetermined flow rate, and also to the density of the fluid; and means for relating said deviations with said first and second predetermined flow rates to determine the actual flow rate.

11. In a fluid conveying conduit an apparatus for determining the volumetric flow rate regardless of density comprising: a first pair of pressure taps disposed on the conduit so that the pressure difference between the two pressure tap locations is zero at a first predetermined velocity; a second pair of pressure taps disposed on the conduit so that the differential pressure between the two locations is zero at a different second predetermined velocity, at least one of said predetermined velocities being approximately at the velocity expected to be measured; first means responsive to the actual pressure difference between said first pair of pressure taps; second means responsive to the actual pressure difference between said second pair of taps; and means for comparing the proportional response of both of said first and second means and said first and second predetermined velocities to determine the volumetric flow rate of the fluid.

12. An apparatus for measuring, independent of its density, the volumetric flow rate of a fluid flowing within a conduit comprising: a fixed resistance within said conduit; means for sensing pressure at a first location on a first side of said fixed resistance; means for sensing pressure of the fluid at a second location on the second side of the fixed resistance; means for sensing pressure at a third location on the second side of the fixed resistance; means for sensing the pressure difference between said first and second locations with said locations being such that the pressure difference between said first and second locations is zero at a first preselected velocity and deviates therefrom at other velocities; means for sensing the pressure difference between said first and third locations with said locations being spaced such that the pressure difference between said first and third locations is zero at a second preselected velocity different than said first preselected velocity and varies therefrom at other velocities; means for relating the deviations of said first and second pressure difference sensing means with said first and second predetermined flow rates to determine the actual flow rate.

13. An apparatus for measuring the volumetric flow rate of a fluid flowing within a conduit, independent of its density comprising: a conduit having resistance to fluid flow; means for establishing a first signal representative of the total of frictional pressure drop and static head between two locations in the conduit; means for establishing a second signal representative of the total of frictional pressure drop and static head between two locations in the conduit selected to have a static head differential different from that of the two locations used to establish said first signal; means for directly relating said first and said second signals with the specific flow rate at which said first signal is zero and the specific flow rate at which said second signal is zero to determine the actual volumetric flow rate.

14. An apparatus as in claim 13 having also a fixed resistance within the conduit between the two locations used to establish said first signal; said means for establishing a first signal including first sensing means sensing the pressure difference between a first and second location in the conduit, said first and second locations being on opposite sides of said resistance and located so that the pressure difference between the two locations is zero at a first preselected velocity and deviates therefrom at other velocities; said means for establishing a second signal including second sensing means sensing the pressure difference between the second and a third location in the conduit, the second and third locations being on the same side of said restriction, with said third location being such that the algebraic sum of the pressure difference between said first and second locations plus the pressure difference between said second and third locations is zero at a second different predetermined flow, and deviates therefrom at other flow rates, and summation means for summating the pressure difference sensed by said first sensing means and the pressure difference sensed by said second pressure sensing means to establish said second signal.

15. An apparatus as in claim 13 having also a fixed resistance within the conduit between the two locations used to establish said first signal; said means for establishing a first signal including first sensing means sensing the pressure difference between a first and second location in the conduit, said first and second locations being on opposite sides of said resistance and located so that the pressure difference between the two locations is zero at a first preselected velocity and deviates therefrom at other velocities; said means for establishing a second signal including second sensing means sensing the pressure difference between the second and a third location in the conduit, said second and third locations being on the same side of said restriction, with said third location being such that the pressure difference between said first and second locations plus a known multiple of the pressure difference between said second and third locations is zero at a second different predetermined flow, and deviates therefrom at other flow rates, means for multiplying said sensed pressure difference between the second and third locations by the known multiple, and summation means for summating the pressure difference sensed by said first sensing means and the multiplied amount of the pressure difference sensed by said second pressure sensing means to establish said second signal.

16. An apparatus as in claim 13 having also: a fixed resistance located within said conduit between the two locations used to establish said first signal; said means for establishing a first signal including first sensing means sensing the pressure difference between a first and a second location in the conduit, said first and second locations being on opposite sides of said fixed resistance and being located such that the pressure difference between said first and second locations is zero at a first predetermined velocity and deviates therefrom at other velocities; said means for establishing a second signal including second sensing means for sensing the pressure difference between the second and third location, said third location being on the same side of said restriction as the second location and being located such that the pressure difference between said first and second locations plus the pressure difference between said second and third locations is equal to zero at a second different predetermined velocity; said means for relating said signals including means for multiplying the pressure difference sensed by said second pressure difference sensing means, means for comparing the multiplied pressure difference to the pressure difference sensed by said first sensing means; means for varying the multiplication factor of said multiplication means until the multiplied pressure difference signal representation is equal in magnitude but opposite in direction to the pressure difference sensed by said first sensing means, means for determining the multiplication factor used to balance the pressure difference signals, and means indicating the volume flow rate as a function of the multiplication signal.

17. An apparatus as in claim 13 including also: a Venturi flow nozzle located within the conduit; said means for establishing a first signal including a first sensing means sensing the pressure difference between a first and second location in the conduit, said first location being at the throat of said Venturi nozzle with said second location being in the conduit downstream of the Venturi flow nozzle, said first and second locations being such that the pressure difference due to flow and the pressure difference due to hydrostatic head between the first and second locations are equal in magnitude but opposite in the direction at a first predetermined flow rate, and deviate therefrom at other flow rates; said means for establishing a second signal including a second sensing means sensing the pressure difference between said first and a third location in the conduit, said third location being located in the conduit downstream of the Venturi flow nozzle and located such that the pressure difference due to flow and the pressure difference due to the hydrostatic head of the fluid between the first and third locations are equal in magnitude but opposite in direction at a second predetermined different flow rate, and deviate therefrom at other flow rates.

18. An apparatus for measuring the volumetric flow rate of a fluid flowing within a conduit, independent of its density comprising: means for establishing a first signal representing a pressure difference in the conduit, said pressure difference having at least a frictional drop component; means for establishing a second signal representing a linear function of a pressure difference in the conduit, said second signal having a frictional pressure drop component and a static head component; means for directly relating said first and second signals with the specific flow rate at which said first signal is zero and the flow rate at which said second signal is zero to determine the actual volumetric specific flow rate.

References Cited

UNITED STATES PATENTS

| | | | |
|---|---|---|---|
| 1,586,948 | 6/1926 | Connet | 73—205 |
| 1,761,295 | 6/1930 | Greenfield. | |
| 2,570,410 | 10/1951 | Vetter. | |
| 2,746,292 | 5/1956 | Vetter. | |
| 2,826,913 | 3/1958 | Rosenberger. | |
| 3,071,160 | 1/1963 | Weichbrod | 73—205 |
| 3,143,880 | 8/1964 | Goldstein et al. | 73—205 |

FOREIGN PATENTS

| | | |
|---|---|---|
| 376,552 | 2/1922 | Germany. |

JAMES J. GILL, Primary Examiner

U.S. Cl. X.R.

73—211